United States Patent [19]
Reyes

[11] Patent Number: 4,605,185
[45] Date of Patent: Aug. 12, 1986

[54] AIRPLANE POWERED BY VEHICULAR MOTOR

[76] Inventor: Daniel Reyes, 233 Broadway, Rm 3615, New York, N.Y. 10007

[21] Appl. No.: 542,461

[22] Filed: Oct. 17, 1983

[51] Int. Cl.[4] ............................................. B64D 35/00
[52] U.S. Cl. ....................................... 244/60; 244/55; 244/58
[58] Field of Search ................... 244/53 R, 60, 62, 58, 244/55; 180/65.2, 7.4

[56] References Cited

U.S. PATENT DOCUMENTS

| | | | |
|---|---|---|---|
| 1,511,448 | 10/1924 | Drum | 244/60 |
| 2,368,630 | 2/1945 | Bizjak | 244/58 |
| 2,462,201 | 2/1949 | Kilgore et al. | 244/60 |
| 4,099,589 | 7/1978 | Williams | 180/65.2 |

Primary Examiner—Galen L. Barefoot
Assistant Examiner—Rodney Corl

[57] ABSTRACT

A motor-generator powered airplane is provided and consists of an internal combustion engine that drives an electric generator. Two transformers are electrically connected to the generator and are each electrically connected to an electric motor. Each electric motor drives a propeller so that the airplane can fly. An emergency battery is connected between the generator and the transformers so that in case of a failure of the engine the battery will supply electricity to continue operation of the electric motors.

1 Claim, 2 Drawing Figures

AIRPLANE POWERED BY VEHICULAR MOTOR

BACKGROUND OF THE INVENTION

The instant invention relates generally to aircraft and more specifically it relates to a motor-generator powered airplane.

The average air speed of a single engine airplane is about 150 M.P.H. with the propeller turning at 2,000 R.P.M. The motor-generator powered airplane has two electric motors each turning at 35,000 R.P.M. through a multi gear box that drives a propeller shaft at an increased R.P.M. Since the motor-generator powered airplane has two electric motors the air speed of the airplane is about 225 M.P.H. Electric motors of greater R.P.M. speeds can be used to increase the air speed when needed.

SUMMARY OF THE INVENTION

A principle object of the present invention is to provide a motor-generator powered airplane that utilizes one internal combustion engine to drive by mechanical and electrical power two electric motors to turn the propellers so that the airplane can fly at a greater speed.

Another object is to provide a motor-generator powered airplane that utilizes an emergency battery so that in case of a failure of the engine the battery will supply electricity to continue operation of the electric motors.

An additional object is to provide a motor-generator powered airplane that has a pilots instrument panel so that the pilot can start and stop the engine and control speed of the propellers when needed.

A further object is to provide a motor-generator powered airplane that is simple and easy to use.

A still further object is to provide a motor generator powered airplane that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
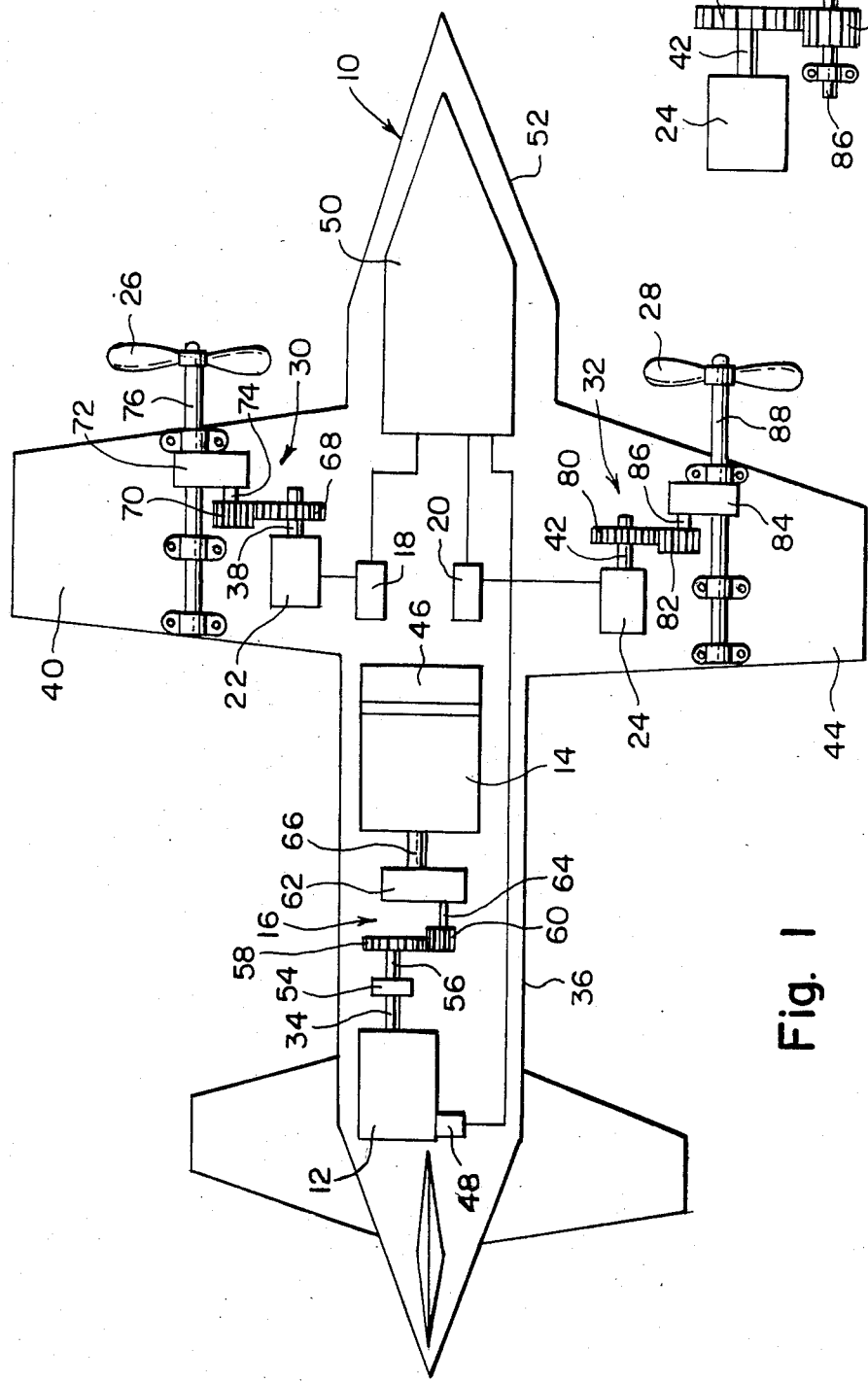
FIG. 1 is a plan view of a diagrammatic representation of the invention.

Turning now descriptively to the drawings, in which similar reference characters denote similar elements throughout the several views, FIG. 1 illustrates a motor-generator powered airplane 10. The airplane 10 consists of an internal combustion engine 12, and electric generator 14, a first drive apparatus 16, two transformers 18 and 20, two electric motors 22 and 24, two propellers 26 and 28 and a second and third drive apparatuses 30 and 32.

The internal combustion engine 12 has a drive shaft 34. The engine 12 is mounted within fuselage 36 of the airplane 10. The generator 14 is also mounted within the fuselage 36 of the airplane 10.

The first drive apparatus 16 is for driving the generator 14 from the engine 12. The two transformers 18 and 20 are mounted within the fuselage 36 of the airplane 10. Each transformer 18 and 20 are electrically connected to the generator 14.

Motor 22 has a drive shaft 38 is mounted within wing 40 of the airplane 10 and electrically connected to the transformer 14. Motor 24 has a drive shaft 42, is mounted within wing 44 of the airplane 10 and electrically connected to the transformer 14. Propeller 26 is rotatably mounted to wing 40 of the airplane 10 and the propeller 28 is rotatably mounted to wing 44 of the airplane 10.

The second drive apparatus 30 is for driving the propeller 26 from the motor 22 and the third drive apparatus 32 is for driving the propeller 28 from the motor 24 so that the airplane 10 can fly at a greater speed.

An emergency battery 46 is mounted within the fuselage 36 of the airplane 10. In case of a failure of the engine 12 the battery 46 will supply electricity to continue operation of the electric motors 22 and 24.

A starter 48 is mounted to the engine 12. A pilot's instrument panel 50 in cockpit 52 of the airplane 10 is electrically connected to the starter 48 and the transformers 18 and 20. The pilot (not shown) can start and stop the engine 12 and control speed of the propellers 26 and 28 when needed.

The first drive apparatus 16 contains a pulley 54 that has a pulley shaft 56 and a large spur gear 58. The pulley 54 is attached to the drive shaft 34 of the engine 12. A small spur gear 60 is driven by the large spur gear 58. A multi gear box 62 has an inlet gear shaft 64 and an outlet gear shaft 66. The inlet gear shaft 64 is attached to the small spur gear 60 and the outlet gear shaft 66 drives the generator 14.

The second drive apparatus 30 contains a large spur gear 68 attached to the drive shaft 38 of the motor 22, a small spur gear 70 that is driven by the large spur gear 68 and a multi gear box 72. The multi gear box 72 has an inlet gear shaft 74 and an outlet gear shaft 76. The inlet gear shaft 74 is attached to the small spur gear 70 and the outlet gear shaft 76 drives the propeller 26.

The third drive apparatus 32 contains a large spur gear 80 attached to the drive shaft 42 of the motor 24, a small spur gear 82 that is driven by the large spur gear 80 and a multi gear box 84. The multi gear box 84 has an inlet gear shaft 86 and an outlet gear shaft 88. The inlet gear shaft 86 is attached to the small spur gear 82 and the outlet gear shaft 88 drives the propeller 28.

Figure 2:
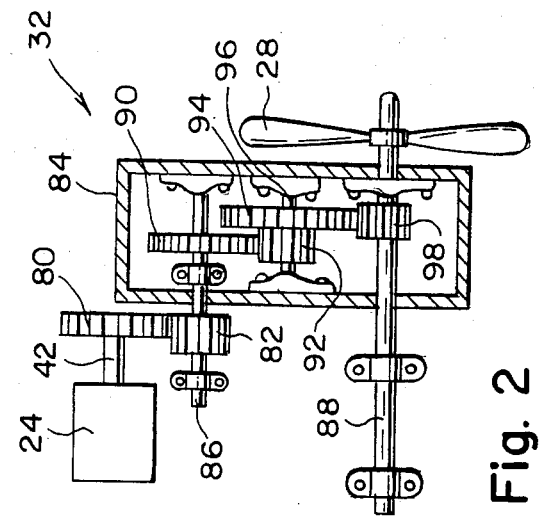
FIG. 2 is an enlarged view partly in section of one of the multi gear boxes that drives a propeller.

FIG. 2 shows the multi gear box 84 in greater detail. The multi gear box 84 contains a first spur gear 90 mounted to the inlet gear shaft 86. A first pinion 92 and second spur gear 94 is rotatably mounted within the gear box 84 on a shaft 96. The first pinion 92 is driven by the first spur gear 90. A second pinion 98 is mounted to the outlet gear shaft 88. The second pinion 98 is driven by the second spur gear 94.

The multi gear box 62 and the multi gear box 72 has the same construction as the multi gear box 84 as described above and shown in FIG. 2.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A motor generator powered airplane which comprises:
- (a) an internal combustion engine having a drive shaft, said engine mounted in the tail of the fuselage of the airplane;
- (b) an electric generator mounted within the fuselage of the airplane;
- (c) means for driving said generator from said engine;
- (d) two transformers mounted symmetrically within the fuselage of the airplane in alignment with the wings, each said transformer electrically connected to said generator;
- (e) two electric motors, each said motor having a drive shaft, mounted symmetrically within a wing of the airplane and electrically connected to one said transformer;
- (f) two propellers, each said propeller rotatably mounted symmetrically to a wing of the airplane, parallel to each motor;
- (g) a starter mounted to said engine;
- (h) a pilot's instrument panel in a cockpit of the airplane electrically connected to said starter and said transformer so that the pilot can start and stop said engine and control speed of said propellers when needed, wherein said means for driving said generator from said engine comprises:
- (i) a pulley having a pulley shaft and a large spur gear, said pulley attached to the drive shaft to said engine;
- (j) a small spur gear driven by the large spur gear;
- (k) a multi gear box having an inlet gear shaft and an outlet gear shaft, the inlet gear shaft attached to said small spur gear and the outlet gear shaft driving said generator, wherein said means for driving each said propeller from said motor comprises:
- (l) a large spur gear attached to the drive shaft of said motor;
- (m) a small spur gear driven by said large spur gear; and
- (n) a multi gear box having an inlet gear shaft and an outlet gear shaft, the inlet gear shaft attached to said small spur gear and the outlet gear shaft driving said propeller, wherein said multi gear box comprises:
- (o) a first spur gear mounted to the inlet gear shaft;
- (p) a first pinion and second spur gear rotatably mounted within said gear box, said first pinion driven by said first spur gear; and
- (q) a second pinion mounted to the outlet gear shaft, and second pinion driven by said second spur gear.

* * * * *